United States Patent [19]

Morgan, Jr.

[11] 4,022,693
[45] May 10, 1977

[54] LIQUID FILTER HAVING MULTIPLE FILTERING ELEMENTS

[75] Inventor: Howard William Morgan, Jr., Michigan City, Ind.

[73] Assignee: Filter Specialists, Inc., Michigan City, Ind.

[22] Filed: June 10, 1976

[21] Appl. No.: 694,820

Related U.S. Application Data

[63] Continuation of Ser. No. 552,536, Feb. 24, 1975, abandoned.

[52] U.S. Cl. .................... 210/345; 210/455; 210/456; 210/477
[51] Int. Cl.² ........................................ B01D 29/10
[58] Field of Search .......... 210/232, 323, 330, 335, 210/474, 345, 455, 456, 477

[56] References Cited

UNITED STATES PATENTS

| | | | |
|---|---|---|---|
| 3,037,634 | 6/1962 | Mills | 210/323 |
| 3,170,873 | 2/1965 | May | 210/323 X |
| 3,503,516 | 3/1970 | Harms et al. | 210/323 |
| 3,524,548 | 8/1970 | McDonald et al. | 210/323 X |
| 3,774,769 | 11/1973 | Smith | 210/232 |
| 3,822,018 | 7/1974 | Krongos | 210/323 |

Primary Examiner—Theodore A. Granger
Attorney, Agent, or Firm—Oltsch & Knoblock

[57] ABSTRACT

A filter which includes a container-shaped housing having a top wall with multiple openings therein. A filter element is fitted into each housing top wall opening. A cover having an offset portion spans the housing top wall with the offset portion thereof being located spacedly above each of the filter elements. The filter housing includes a liquid outlet. A liquid inlet is provided which directs liquid into the space under the offset portion of the cover. The liquid then passes downwardly through the filter elements, into the interior of the housing, and out the liquid outlet in the housing.

10 Claims, 5 Drawing Figures

U.S. Patent  May 10, 1977  Sheet 1 of 3  4,022,693
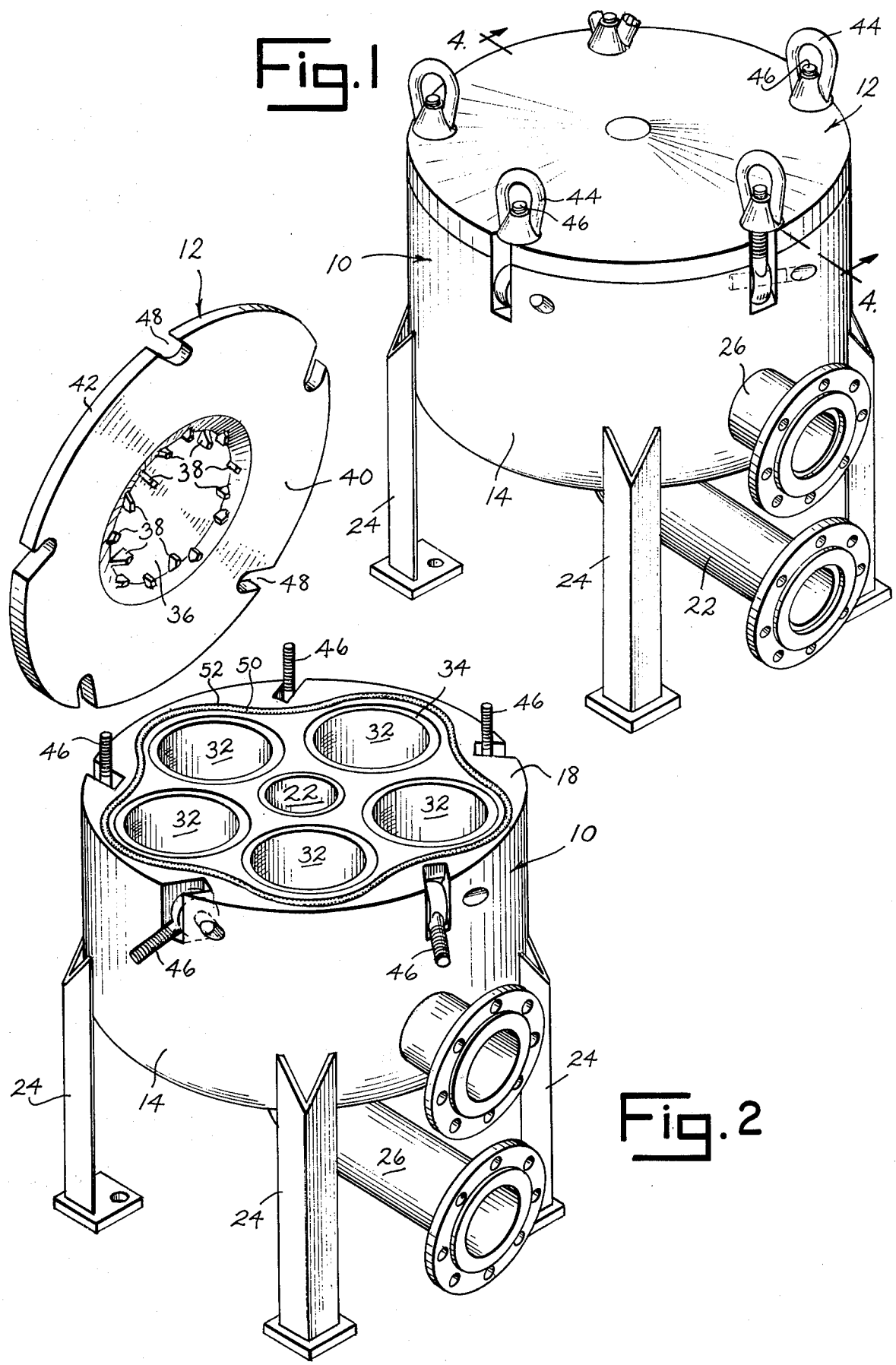

LIQUID FILTER HAVING MULTIPLE FILTERING ELEMENTS

This is a continuation of application Ser. No. 552,536, filed Feb. 24, 1975, now abandoned.

SUMMARY OF THE INVENTION

This invention relates to a filter for liquid material and will have application to a filter having a plurality of filtering elements individually supported by the top wall of the filter housing.

The filter of this invention includes a housing having side, bottom and top walls and an outlet port formed in it. The top wall of the housing has a plurality of openings formed therein which communicate with the interior of the housing. A filtering element is fitted into and supported within each of the top wall openings. A cover spans the top wall of the housing and includes a portion which is spacedly positioned above each of the filtering elements. The filtering elements are removable to facilitate replacement and cleaning and are held in seated positions in the top wall of the housing by the cover. An inlet is formed in the filter by which liquid enters the space or area between the cover and the housing top wall. The liquid then flows downwardly through the filtering elements into the interior of the housing where it is discharged through the outlet port in the housing.

The cover is secured to the top wall of the filter housing by means of a plurality of hold down bolts. The hold down bolts are inwardly spaced from the peripheral edge of the housing top wall so as to apply a compressive force directly over the cover and top wall, thereby reducing the need for strengthening the side walls of the filter housing and making the filter more economical to produce.

Accordingly, it is an object of this invention to provide a filter which is for liquid material and which has a plurality of individual filtering elements placed in liquid flow communication between the inlet and outlet ports of the filter.

Another object of this invention is to provide a liquid filter which is of efficient operation and of simple maintenance.

Still another object of this invention is to provide a liquid filter having a plurality of removable individual filtering elements supported by the top wall of the filter housing and spanned by a removable cover.

And still another object of this invention is to provide a liquid filter having a housing which includes a top wall and a cover which spans the housing and is secured thereto by a plurality of hold down means located inwardly of the peripheral outer edge of the housing top wall.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 1 is a perspective view of the filter with its cover closed.

FIG. 2 is a perspective view of the filter with its cover opened.

DESCRIPTION OF THE PREFERRED EMBODIMENT

Figure 3:
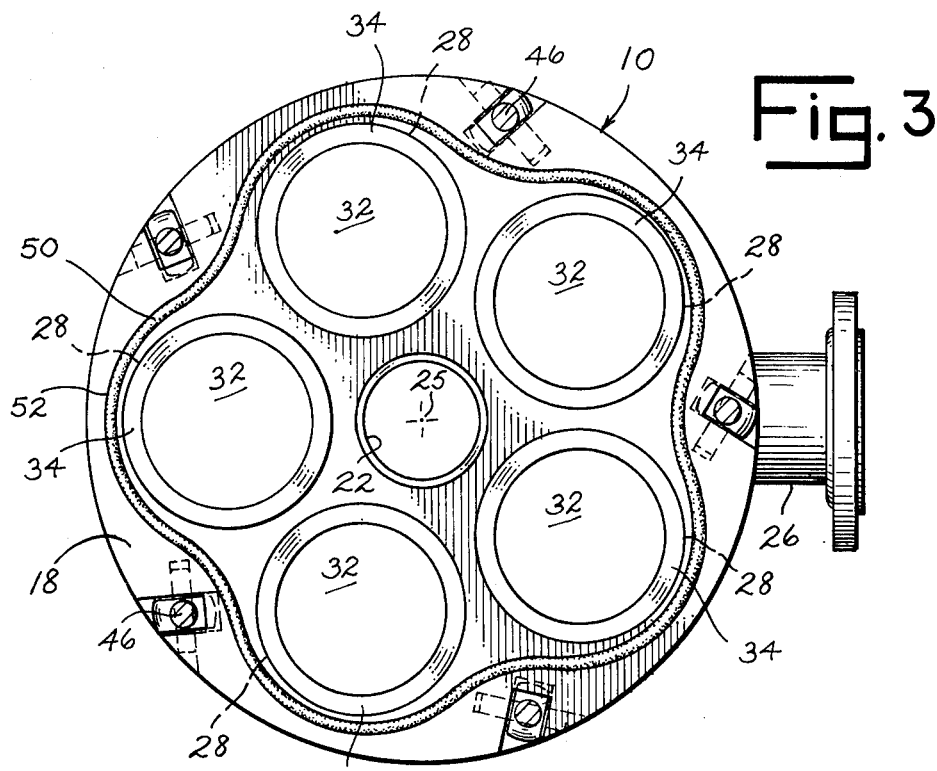
FIG. 3 is a top plan view of the housing of the filter shown with its cover removed.

The preferred embodiment illustrated is not intended to be exhaustive or to limit the invention to the precise form disclosed. It has been chosen and described in order to best explain the principles of the invention and its application and practical use to thereby enable others skilled in the art to best utilize the invention.

The filter illustrated in the drawings includes a housing 10 and a cover 12. Housing 10 includes a side wall 14, which is preferably cylindrical, a bottom wall 16 and a top wall 18. Suitable pods 24 or feet may be connected to housing 10 for the purpose of supporting the filter in an upright position on the floor, ground or other type of foundation. A conduit 22 which serves as an inlet for the filter projects upwardly through bottom wall 16 and terminates at its inner open end in top wall 18 of the housing. Conduit 22 extends through housing 10 in coaxial alignment with axis 25 of the housing and is suitably sealed, such as by welding, where it passes through bottom wall 16 and where it joins housing top wall 18 to prevent liquid leakage around the conduit at those locations. A conduit 26 is connected into housing side wall 14 near its junction with housing bottom wall 16 and forms an outlet for the filter.

Top wall 18 of housing 10 has a plurality of openings 28 formed in it. Openings 28, which are five in number in the illustrated embodiment, are equal angularly spaced apart and equal radially spaced from axis 25 of the housing. Each opening 28 is radially spaced from conduit 22 and is defined by a shoulder 30 formed in top wall 18. A filter element 32 is fitted into each opening 28 in housing top wall 18. Each filter element is bag-shaped and has an open top formed by a ring part 34. Filter elements 32 may be formed of a screen or similar generally rigid reticulated material, cloth or a similar flexible interwoven filtering material, or a combination of both a reticulated screen which serves as a shape retaining member and an interfitting interwoven filtering material. Each filter element 32 extends downwardly through its accommodating opening 28 with its ring part 34 being seated upon shoulder 30 of the opening. To improve the sealing characteristics between ring part 34 of each filter element and housing top wall 18, an O-ring or similar type sealing element could be located between opening shoulder 30 and the bottom of ring part 34, or ring part 34 could be formed of or coated with an elastic shape-retaining material which when covered and if contacted by cover 12 would form a positive liquid-tight seal about shoulder 30.

Cover 12 of the filter spans top wall 18 of housing 18 and includes a centrally located cavity part or upwardly projecting offset portion 36 which is located spacedly above the upper surface of top wall 18 and over the open ends of filter elements 32 seated within openings 28 in the top wall. Cover offset portion 36 is preferably concentric with housing axis 25 and includes a plurality of depending fingers 38 which in conjunction with the outer marginal portion 40 of the cover overlie ring parts 34 of filtering elements 32 to hold the filtering elements within openings 28 in the housing top wall. Marginal portion 40 of the cover covers approximately two-thirds to three-fourths of each filter element ring part 34 with three cover fingers 38 covering spaced portions of the remaining one-third or one-fourth of the ring part. Each set of three fingers 38 are equal angularly spaced apart and equal radially spaced from the center of their contacting ring part 34. Also, each finger 38 serves as a vane by which liquid entering through inlet conduit 22 is directed downwardly from housing offset portion 36 into the filter elements. The number of openings 28 in housing top wall 18, corresponding filter elements 32 and cover fingers 38 can vary depending upon the size and desired capacity of the filter.

Cover 10 has a circular outer edge 42 to accommodate cylindrical side wall 14 of housing 10 and is secured to the housing by means of a plurality of eye-bolts 44 or similar hold down members. The location of eye-bolts 44 relative to outer edge 42 of cover 12 is of importance, since the compressive force exerted by the eye-bolts is located directly over the cover and underlying housing top wall 18 next to side wall 14 of the housing. Eye-bolts 44 are turned upon threaded members 46 which are pivotally secured to housing 10 at its side wall 14. Threaded members 46 are five in number and are equal angularly spaced apart and equal radially located from the axis 25 of housing 10. With cover 12 spanning top wall 18 of housing 10, threaded members 46 project upwardly through slots 48 in the cover. Each threaded member 46 is preferably equal angularly located between two adjacent openings 28 in top wall 18.

Figure 4:
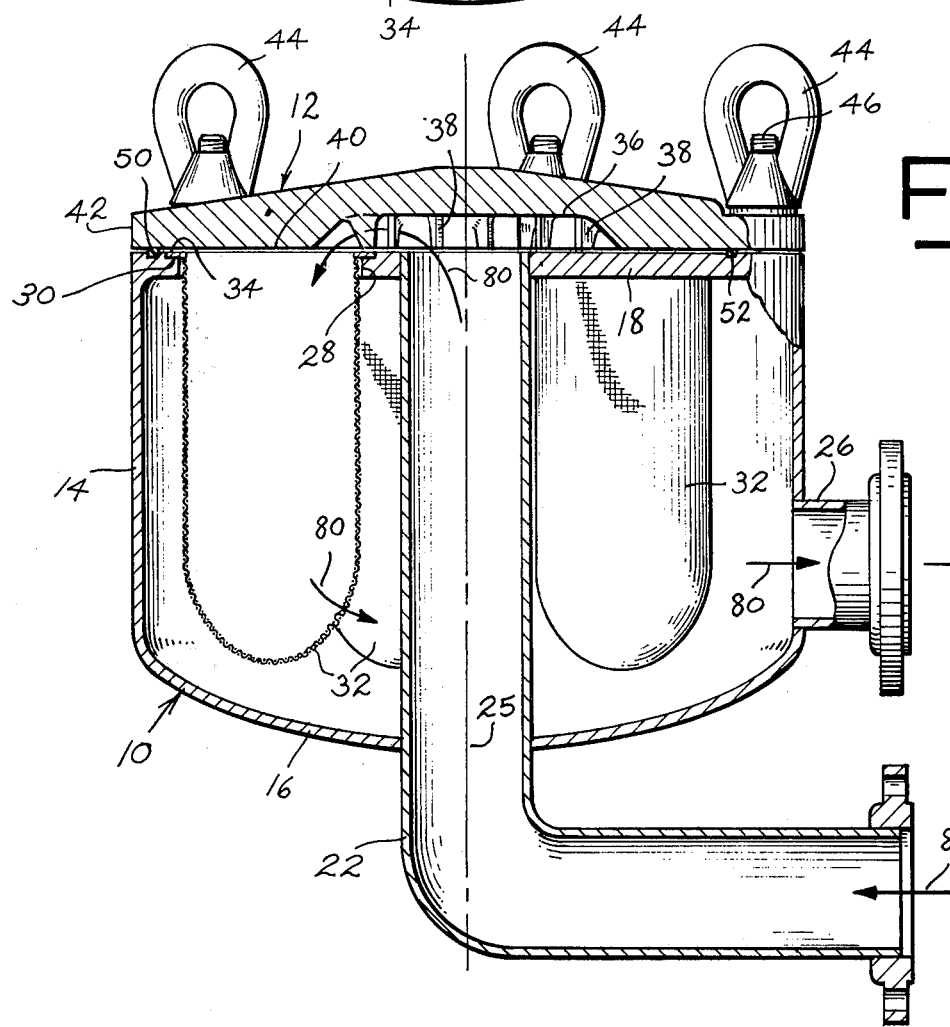
FIG. 4 is a vertical sectional view of the filter taken along line 4—4 of FIG. 1.
Figure 5:
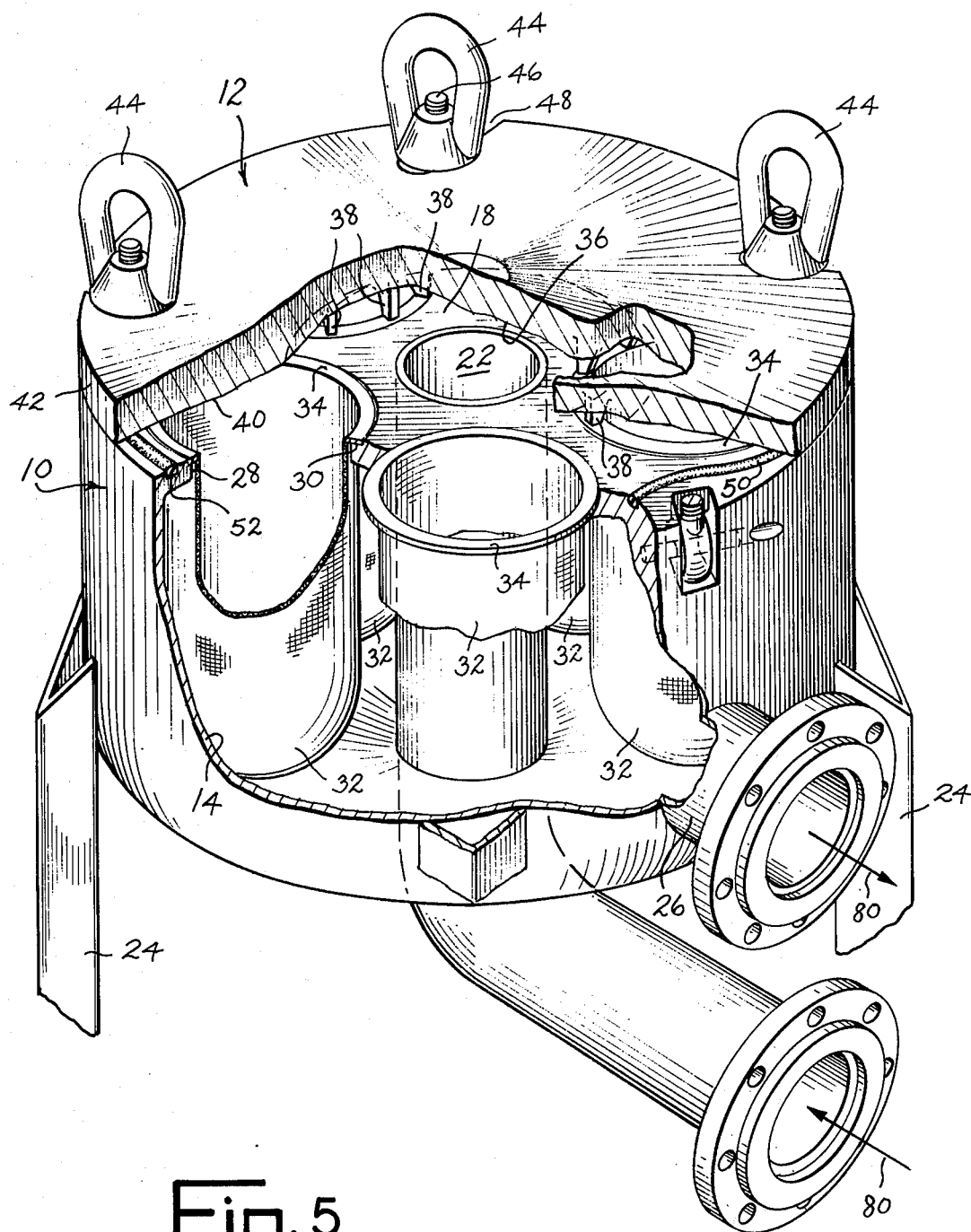
FIG. 5 is a perspective view of the filter having portions of its housing and cover broken away for purposes of illustration.

With cover 12 spanning top wall 18 of the housing, eye-bolts 44 are turned upon threaded members 46 and brought to bear against the outer surface of cover 12. This causes the cover to be brought into sealing engagement with housing 10, overlying each of the filter element ring parts 34 with its marginal portion 40 and fingers 38. The peripheral seal between cover 12 and top wall 18 of housing 10 is accomplished by means of a continuous sealing member 50. Sealing member 50 may be formed of rubber or a flexible plastic material and is seated within a winding groove 52 formed in the top wall. Groove 52, as best seen in FIGS. 4 and 5, extends about openings 28 in top wall 18 and is located inwardly of each threaded member 46.

In operation, as shown by arrows 80, liquid enters the filter by conduit 22 and flows upwardly in the conduit through housing 10 where it is discharged above top wall 18 within the space formed between top wall 18 and offset portion 36 of cover 12. The liquid then flows downwardly through the open top in filter elements 32, through the filtering elements and into the interior of housing 10 and out through conduit 26. When it is desired to clean or replace one or more filter elements 32, eye-bolts 44 are removed from threaded members 46 and the cover lifted from top wall 18 of the housing. The filtering elements then each can be lifted from each of the openings 28 and either cleaned, repaired or replaced in preparation for the next filtering operation. Cover 12 and housing 10 may be of a cast or fabricated construction formed of various materials, such as cast iron or stainless steel. When cover 12 overlies filter elements 32, its marginal portion 40 and fingers 38 may either be slightly spaced from ring parts 34, as shown in the drawings, or contact the ring parts.

It is to be understood that the invention is not to be limited to the details above given but may be modified within the scope of the appended claims.

What I claim is:

1. A filter comprising a housing including side and bottom walls and having a top wall spaced from said bottom wall, said housing having a liquid outlet, said housing top wall having at least two spaced openings formed therein, removable bag-shaped filtering means for straining a liquid having an open upper end fitted into each top wall opening, each filtering means being supported by said top wall at its open end projecting into the interior of said housing below said top wall, a removable cover spanning said housing top wall, said cover including a peripheral lower face portion and an inner upper face portion upwardly offset from said lower face portion, said cover lower face portion overlying only a section of each filtering means at its open end to retain said filtering means within said housing top wall openings, said cover upper face portion being spaced from said housing top wall and from each filtering means at its open end to provide flow passages from the upper face portion to each filtering means open end, and a liquid inlet in communication with said cover upper face portion whereby liquid can pass through the inlet into the filtering means and thereafter through said filtering means and into the interior of said housing and out the outlet therein.

2. The filter of claim 1 and a plurality of spaced projection means depending from said cover upper face portion, at least one said projection means overlying each filtering means at a location spaced from said section overlaid by said cover lower face portion for retaining said filtering means within said housing top wall openings in conjunction with said cover lower face portion.

3. The filter of claim 2 wherein said housing side wall is formed about an axis extending through the top wall thereof, said top wall having at least three of said openings therein formed angularly about and spaced from said housing axis, a said filtering means fitted removably within each opening, a said projection means overlying each filtering means at its open end.

4. The filter of claim 3 and conduit means defining said inlet extending through the interior of said housing and terminating in an open end part in said housing top wall under said cover upper face portion and between said top wall openings for conducting liquid from an outside source to that area between said cover upper face portion and said housing top wall above said filtering means open ends, said top wall openings being equally spaced apart and equal radially spaced from said housing axis, at least two of said projection means overlying each filtering means open end, said filtering means being spaced from said open end part of the conduit means.

5. The filter of claim 1 wherein said housing side wall is formed about an axis extending through the top wall thereof, said top wall having at least three of said openings therein formed angularly about and spaced from said housing axis, a said filtering means fitted removably within each opening.

6. The filter of claim 5 and conduit means defining said inlet extending coaxially through the interior of said housing and terminating in an open end part in said housing top wall under said cover upper face portion and between said top wall openings for conducting liquid from an outside source to that area between said cover upper face portion and said housing top wall above said filtering means open ends whereby said liquid can pass through said filtering means.

7. The filter of claim 6 wherein said top wall openings are equally spaced apart and equal radially spaced from said housing axis.

8. The filter of claim 3 wherein said housing top wall is concentric with said housing axis, said top wall openings being spaced apart and inwardly spaced from the outer edge of said top wall, a plurality of hold down means for securing said cover to said housing, said hold down means being peripherally located about and inwardly spaced from said top wall outer edge.

9. The filter of claim 8 and a continuous seal means compressed between said cover lower face portion and housing top wall, said seal means for enclosing said top wall openings and extending between each such opening and top wall outer edge and inwardly of each hold down means.

10. The filter of claim 9 wherein said top wall openings are equal angularly spaced apart and equal radially spaced from said housing axis, said hold down means being equal angularly spaced from one another and angularly offset from said top wall openings.

* * * * *

UNITED STATES PATENT AND TRADEMARK OFFICE
CERTIFICATE OF CORRECTION

PATENT NO. : 4,022,693
DATED : May 10, 1977
INVENTOR(S) : Howard William Morgan, Jr.

It is certified that error appears in the above-identified patent and that said Letters Patent are hereby corrected as shown below:

In Claim 1, at column 4 and line 8, after "end" insert ---and---.

*Signed and Sealed this*

*Twentieth* Day of *February 1979*

[SEAL]

Attest:

RUTH C. MASON
*Attesting Officer*

DONALD W. BANNER
*Commissioner of Patents and Trademarks*